UNITED STATES PATENT OFFICE.

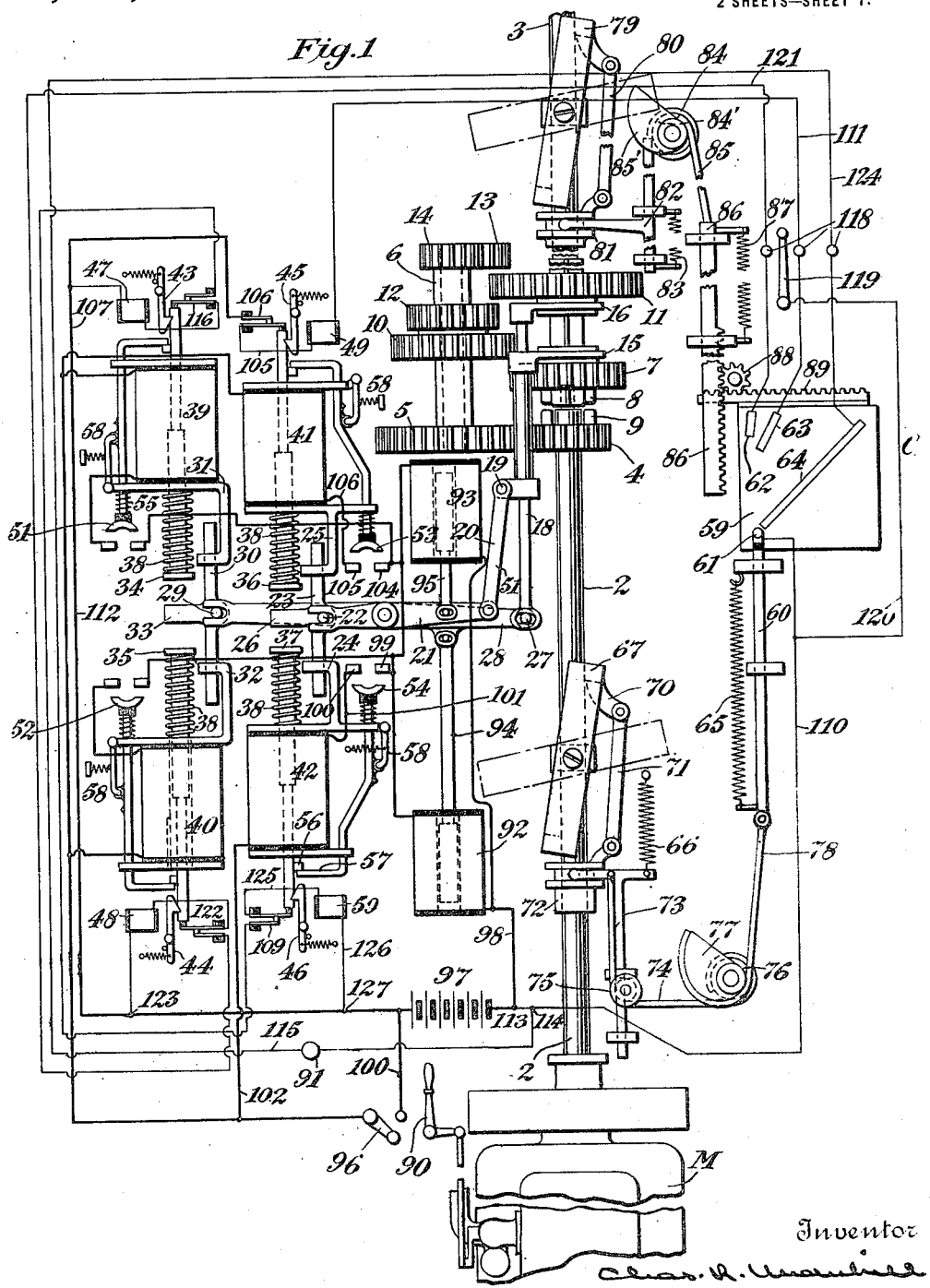

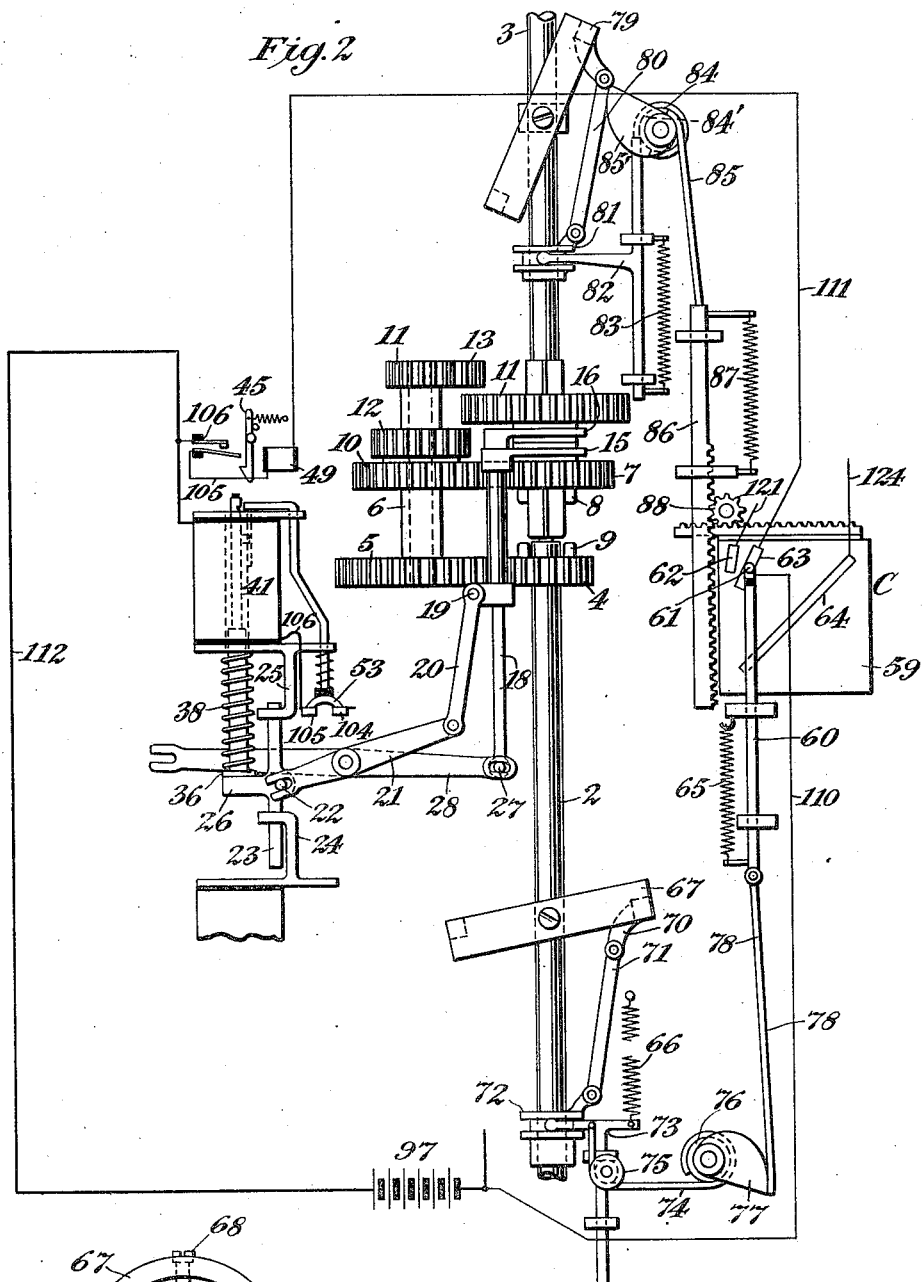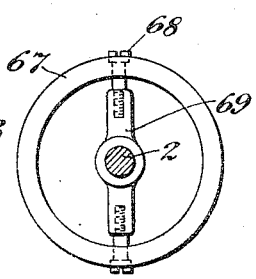

CHARLES R. UNDERHILL, OF NEW HAVEN, CONNECTICUT.

POWER-TRANSMISSION MECHANISM.

1,287,801. Specification of Letters Patent. Patented Dec. 17, 1918.

Application filed March 12, 1917. Serial No. 154,299.

*To all whom it may concern:*

Be it known that I, CHARLES R. UNDERHILL, a citizen of the United States, and resident of New Haven, in the county of New Haven and State of Connecticut, have invented certain new and useful Improvements in Power-Transmission Mechanism, of which the following is a specification.

This invention relates to power transmission mechanism of the type including a driving element, a driven element, and means for connecting the two elements to operate the driven element in various speed relations to the driving element.

The primary object of the invention is to provide power transmission mechanism of such a character that the connecting mechanisms between the driving element and the driven element are automatically and selectively rendered operative when predetermined speed ratios between the two elements are established.

With these and other objects in view, such as will appear as the description progresses, the invention comprises the combination and arrangement of parts, as set forth in and falling within the scope of the appended claims.

The embodiment of the invention here shown, which is merely selected for the sake of convenience of illustration, comprises, broadly, a driving shaft, a driven shaft, and selective transmission means for connecting the latter to the former. Suitable devices are provided for shifting the transmission means so as to establish the proper and desired speed relation between the driving and the driven shafts, which shifter devices are positively operated by spring-actuated plungers. These plungers are normally prevented from operating by latch members, which positively engage the same, but which latch members may be subjected to magnetic influence, so as to selectively release the plungers to permit them to selectively operate the shifter devices to shift the transmission means. The electro-magnets which exert their influence on the latch members are, themselves, controlled by a suitable device which comprises a pair of movable elements, one of which carries a terminal common to all of the circuits in which the magnets are interpolated, and the other of which carries a separate terminal for each of said circuits. The elements of this controlling device move in such relation that the terminals of the several circuits will be brought successively and selectively into contact with each other to close the proper and desired circuit. The movements of these elements are controlled, automatically, by means operated by the driving and driven elements, which means are in the nature of centrifugal governors which are mounted on the said driving and driven elements and are independently operable. Means are also provided in the mechanism for resetting the plunger subsequent to the actuation of the shifter devices, so that they will be in the proper positions for subsequent operation.

In the embodiment of the invention illustrated in the drawings:—

Figure 1 is a diagrammatic representation of the power transmission mechanism;

Fig. 2 is a similar view showing portions of the mechanism in different positions from those illustrated in Fig. 1; and Fig. 3 is a detail of one of the operating elements for the controller.

In the drawings, there is illustrated a source of power in the form of a motor M from which a driving shaft 2 extends, in alinement with which is a driven shaft 3. There are illustrated a plurality of means for connecting the two shafts together, which means include a gear 4 which is secured to the driving shaft 2, and a gear 5 which is secured to a counter shaft 6, and the teeth of which intermesh with the teeth of the gear 4. The diameter of the gear 4 is substantially equal to one-half of that of the gear 5. Slidably mounted on, but rotatable with the driven shaft 3 is a gear 7 which has a clutch member 8 formed on the face thereof adjacent to the gear 4, which clutch member is adapted to interengage with a clutch member 9 formed on said gear 4. When these clutch members 8 and 9 are interengaged, the speed of the driven shaft 3 will be equal to that of the driving shaft, as there will be a direct driving connection between the two. The gear 7 is adapted to be shifted longitudinally along the shaft 3, so that its teeth will intermesh with the teeth of a gear 10 which is secured to the shaft 6 and is substantially equal in diameter to the gear 7, so that when it is in intermeshing relation with said gear, the driven shaft 3 will be driven at a predetermined and intermediate speed. An additional gear 11 is mounted on the driven shaft 3 for longitudinal movement, but so as to be rotatable therewith, which gear is adapted to interengage with a gear 12 on the shaft 6, so that the driven shaft 3 will have imparted thereto motion, at a predetermined and low speed. The gear 11 is also adapted to be shifted to interengage with an idler 13, which, itself, intermeshes with a relatively small gear 14 on the shaft 6. It will be perfectly obvious that when the latter relation of gears is set up, the driven shaft 3 will have motion imparted thereto in a reverse direction to that of the driving shaft.

In order that the gears 7 and 11 on the driven shaft 3 may be shifted in both directions, I have provided shifters 15 and 16, respectively, the latter of which is operable independently of the former. Pivotally secured to the shifter 15, at 19, is a link 20 which, at its other end, is pivoted to a lever 21 at one end of the latter. The other end of this lever 21 is bifurcated and engages a pin 22 which is carried by a movable slide 23, which slide operates in guides 24 and 25 and is provided with a projection 26, for a purpose which will later be described. The other shifter 16 is pivoted directly, at 27, to a lever 28. This lever is, like the lever 21, bifurcated at its end and engages a pin 29 on a slide 30, which slide is operable in guides 31 and 32 and is provided with a projection 33 extending in the same direction as the projection 26 on the slide 23.

It will be seen that when either of the projections 26 or 33 is moved in either direction, the clutch or proper gear on the driven shaft will be moved to insure the rotation of the shaft at the desired speed.

In order that the slides 23 and 30 may be moved in both directions, positively, and the connecting shifters consequently operated, a plurality of spring-actuated plungers 34, 35, 36 and 37 are provided, which plungers are moved to engage the proper projection 26 or 33 by springs 38 which surround the plungers, as illustrated in the drawings. These plungers are moved respectively in the opposite directions or away from the projections 26 and 33 on the slides 23 and 30 under the influence of solenoid magnets 39, 40, 41 and 42, which are selectively energized, in a manner which will later appear.

The plungers are maintained in retracted positions with the surrounding springs 38 under tension by spring-actuated latch members 43, 44, 45 and 46, which, however, are respectively and selectively disengaged from the plungers by electro-magnets 47, 48, 49 and 50, of which they form the armatures, thus allowing the springs 38 to operate. It is, of course, to be understood that when the plungers are in their retracted positions, so that the springs 38 are under tension, the retracting magnets are deënergized, and in order that the magnets may be energized after the plungers have performed their function of shifting the gears, a plurality of circuit closers 51, 52, 53 and 54 are provided, which are normally urged to operative positions by springs 55, but prevented from assuming such positions, when the plungers are in their retracted positions, by projections 56 on the plungers which engage arms 57 on the circuit closers. These circuit closers are maintained in their several positions by spring-actuated detents 58. When one of the plungers is actuated under the influence of its spring 38, the corresponding circuit closer is permitted to move under the influence of its actuating springs 55 to close the circuit through the adjacent solenoid magnet, at this point.

In order that the electro-magnets 48, 49 and 50 may be automatically and selectively energized, so as to permit the proper and desired plunger to operate, there is provided a controller, indicated generally by the reference character C. This controller carries the terminals of the circuits in which the magnets last referred to are interpolated, and comprises two movable elements 59 and 60, the former of which is movable in one direction and the latter of which is movable in a direction which extends in angular relation to the line of movement of the former element. The element 60 carries a contact 61 which is a common terminal for all of the circuits from the last-mentioned magnets, and is adapted, when the element 60 is moved, to engage any one of the contacts 62, 63 or 64, which latter are carried by the elements 59 and form the other terminals of the circuits from the referred-to magnets. Thus, when the contact 61 engages any one of the contacts 62, 63 or 64, the circuit through the proper magnet 48, 49 or 50 will be closed and the corresponding plunger permitted to operate. By reason of the number of its parts and movements I term the controller C, a compound circuit controller.

The movements of the elements 59 and 60 of the controller are effected in the following manner. The element 60 is moved to its operative positions by suitable means, such as a spring 65, which spring is, however, normally prevented from operating by a spring 66, which posesses greater energy. Mounted on the driving shaft 2 is an element which governs the action of the springs 65 and 66 and which is termed a governor, for the sake of convenience. This governor includes an annular member 67 which is pivoted by means of screws 68 on the driving shaft 2 through the medium of a casting 69, so that the member 67 will rotate with the shaft and may have movements at right angles to the axis of the shaft under centrifugal influence. Pivoted to an arm 70, which extends from the member 67, is a link 71, which, in turn, is pivoted to a collar 72 which is slidable on the driving shaft 2 and rotates therewith. To this collar 72, a slide 73 is connected by means of pins which extend into an annular groove in the collar, so that when the collar reciprocates on the shaft, a similar movement will be imparted to the slide. One end of the spring 66 is connected to this slide 73, while the other end is connected to a suitable stationary part. Secured to and extending from the slide 73 is a flexible member 74 which passes around rollers 75 and 76 and is secured to the latter. On the trunnion which carries the roller 76, a cam 77 is mounted, and secured to and passing around the cam surface thereof is a flexible member 78 which is secured to the element 60 of the controller. Thus, as the speed of the driving shaft 2 increases, the governor will move into successively increasing angular relations to the shaft and will, in turn, cause the movement of the collar 72 and the slide 73 against the tension of the spring 66. This movement of the slide 73 will permit the spring 65 to operate and the element 60 will be moved into one of its operative positions. Of course, on the contrary, as the speed of the shaft decreases, the spring 66 is permitted to retract the element 60 through the slide 73 and the flexible members 74 and 78 against the tension of the weaker spring 65.

The movement of the other element 59 of the controller is controlled similarly by a governor on the driven shaft 3, which is similar in construction to that already described, comprising an annular member 79 which is connected by a link 80 to a sliding collar 81 on the shaft 3, which collar operates a slide 82 against the influence of a spring 83, and through flexible members 84 and 85 controls a sliding rack 86. This rack 86 is urged in one direction by a spring 87. The teeth on the rack 86 intermesh with those on a pinion 88, which pinion teeth likewise intermesh with those on a second rack 89, which latter rack is secured to the movable element 59 of the controller. It, of course, will be obvious that when the elements 59 and 60 are moved predetermined distances, the contact 61 will engage one of the contacts 62, 63 or 64, and close the proper circuit, so that the proper gear will be shifted to drive the shaft 3 ahead at a predetermined speed, and the gears which are shifted will depend upon the relative speeds between the driving shaft 2 and the driven shaft 3, the speed of the former being controlled, when it is driven by a combustion motor, by a throttle 90.

The shaft 3 is driven in a reverse direction when the teeth of the gear 11 intermesh with the idler 13, and the former gear is shifted into such relation by the plunger 34, as has been previously described. The magnet 47, which controls the movement of the plunger through the latch 43 which forms its armature, is interpolated in a circuit which is manually closed by means of a switch 91. Of course, it will always be necessary to shift the gears into neutral positions before any particular set of gears can be shifted into interengaging relation, and for this purpose, a pair of solenoid magnets 92 and 93 is provided, the former of which controls a link 94, which is connected to the lever 28, and the latter of which controls a link 95, which is connected to the lever 21. These magnets, when energized through the closing of a manually operable switch 96, will move the gears to their neutral positions.

Passing now to the operation, and assuming that the clutch members 8 and 9 are interengaged so that the driving shaft and the driven shaft will be rotating at equal speeds, and that it is desired to shift the gear 7 into engagement with the gear 10 so that the driven shaft will rotate at substantially one-half the speed of the driving shaft, it is necessary to first close the switch 96. It is to be remembered that the clutch members have been shifted into their interengaging relation by the plunger 37, which, after having caused the shifting of the clutch members, remains in engagement with the projection 26 on the slide 23 with most of the energy of the spring 38 spent. Upon the closing of the switch 96, an electrical circuit is established from a source 97 through a conductor 98, through the magnets 92 and 93 to the point 99 through the circuit closer 54, which has moved into engagement with the terminals 99 and 100 upon the working movement of the plunger 37, through the magnet 42 and the conductor 101, through the conductor 102, through the switch 96 to the source 97. Upon the energizing of the magnet 42, the plunger 37 will immediately be retracted against the action of the spring 38, and since the electro-magnet 50 is at this time deënergized, the latch member 46 will engage the plunger and retain it in its retracted position. The magnet 93 will operate, through the medium of the link 95, to shift the clutch members and the gear 7 to neutral position. It is to be understood that the movement of the plunger 37, under the action of the magnet 42, closes a circuit in which the electro-magnet 50 is interpolated, at the point 109, so that this magnet will be ready for a subsequent operation. The switch 96 is then opened. When the driving shaft and the driven shaft are rotating at the same speed, as, for instance, when the clutch members 8 and 9 are interengaged, the elements of the controller will be moved to their greatest extent, so that the contact 61 on the element 60 will engage the contact 64 on the element 59, but when the clutch members 8 and 9 have been disengaged in the manner just described, the speed of the driven shaft 3 will gradually decrease, so that the governor 79 will move toward the shaft, and through its connection with the pinion 88, cause the element 59 of the controller to move until the contact 63 thereon engages the contact 61 on the element 60. At this time, the tooth speed of the gear 7 will be equal to the tooth speed of the gear 10, so that the engagement of the gears may take place with safety. Upon the engagement of the contacts 61 and 63, a circuit is closed from the source 97 through the conductor 110, the contacts 61 and 63, the conductor 111, the electro-magnet 49, the conductor 105, the switch 106 and the conductor 112 back to the source. Thus, at the time that the tooth speeds of the gears 7 and 10 are equal, the magnet 49 will be energized and the latch 45 attracted so as to disengage the plunger 36. This plunger, upon being disengaged, moves toward the lever 21 rapidly, under the action of the spring 38 and, through the slide 23, the lever 21, and the mechanism between this lever and the gear 7, shifts the gear 7 into engagement with the gear 10. Upon the movement of the plunger 36, the circuit closer 53 will bridge the terminals 104 and 105, so that upon the operation of the switch 96, the magnet 41 will be energized and will retract the plunger 36, in order that the gear 7 may subsequently be moved to a neutral position. It will, of course, be understood that the drive is changed from direct to intermediate, and thence to low, in a similar manner, and upon the energizing of the proper magnet 48 or 49 by the automatic closing of its circuit by the controller C.

Of course, it will be understood that when the contact 61 on the controller element 60 engages the contact 62 on the controller element 59, the gears 11 and 12 will interengage in a manner similar to that described in connection with the shifting of the gear 7, the circuit to the plunger-controlling magnet 48 being, at this time, established from the source 97 through the conductor 110, the contacts 61 and 62, the conductor 121 and the closed switch 122, through the magnet 48 to the point 123 on the conductor 112 and through the conductor 112 back to the source.

As has been previously pointed out, the clutch members 8 and 9 are shifted into engagement with each other by the plunger 37 upon the disengagement of the latch member 46. The trip magnet 50 for this latch member is energized upon the engagement of the contacts 61 and 64 of the controller and the consequent establishment of a circuit from the source 97 through the conductor 110, the contacts 61 and 64, the conductor 124, the closed switch 109, the conductors 125 and 126 to the point 127, and thence back to the source 97 through the conductor 112.

As has been previously stated, the driven shaft 3 is moved in a reverse direction by the engagement of the gear 11 with the idler 13, and this gear 11 is shifted into engagement with the idler upon the manual closing of the switch 91, and the consequent establishment of a circuit from the source 97 through a conductor 113 to the point 114, through a conductor 115, in which the switch 91 is interpolated, through the switch 116, the electro-magnet 47 and a conductor 112 back to the source. The consequent energizing of the magnet 47 disengages the latch 43 from the plunger 34 and permits the plunger, under the action of its spring, to strike the projection 33 on the slide 30 and shift the gear 11, so that when the speed of the shaft 3 is such that the tooth speed of the gear 11 is equal to the tooth speed of the idler 13, the gear and idler will engage. Of course, upon the movement of the plunger 34, under the action of the spring 38, the circuit closer 51 will move, so that upon the closing of the switch 96, the magnet 39 will be energized and the plunger 34 retracted to permit the movement of the gear 11 into a neutral position.

In order that the shifting of the gears 7 and 11 and the clutch member 8 may be manually accomplished, I have provided each of the circuits leading to the electromagnets 48, 49 and 50 with contacts 118, which are arranged to coöperate with a common switch blade 119. This common blade 119 is in electrical communication with the conductor 110 through a conductor 120. Thus the latch releasing magnets may be selectively energized by the manual closing of their circuits.

It will be seen from the foregoing description that in order to accomplish the shifting of the gears, it is only necessary for the operator to first momentarily close the switch 96, so that the gears will be thrown into neutral positions. If he is shifting the gears from the direct drive where the clutch members 8 and 9 are interengaged, and the contacts 61 and 64 on the controller are engaged, to the intermediate speed where the gears 7 and 10 are engaged, he may permit the speed of the driven shaft 3 to decrease with relation to that of the driving shaft 2 until the tooth speeds of the gears 7 and 10 are equal, at which time, the contacts 61 and 63 on the controller will be in engagement with each other, owing to the fact that the element 60 of the controller remains in its initial position, while the element 59 is moved to bring the contact 63 into engagement with the contact 61. Immediately upon the establishment of the circuit by the engagement of these contacts, the gears will be shifted. The operator may, however, bring about the same result by increasing the speed of the driven shaft 2 after the gears have been thrown into neutral, so that the same speed ratio between the driving and driven shafts is established.

What I claim is:—

1. In a power transmission mechanism, the combination with a driving element and a driven element, of means for connecting them which is effective automatically when a predetermined speed ratio has been established between the elements.

2. In a power transmission mechanism, the combination with a driving element and a driven element, of means for connecting said elements together in different speed ratios at different times, and means for bringing said connecting means into operation automatically when the speeds of said elements have been brought to a selected ratio.

3. In a power transmission mechanism, the combination with a driving element and a driven element, of means for connecting the same together, and means for automatically rendering said connecting means operative when a predetermined speed relation between said driving and driven elements is established.

4. In a power transmission mechanism, the combination with a driving element and a driven element, of a plurality of means for connecting the same together, and means for automatically and selectively rendering the same operative when the speeds of the driving and driven elements bear a predetermined ratio.

5. In a power transmission mechanism, the combination with a driving element and a driven element, of means for connecting said elements together in different speed ratios at different times which include separately operative means for each ratio, and means for effecting such connection automatically when said elements have been independently brought to a selected ratio.

6. In a power transmission mechanism, the combination with a driving element and a driven element, of a plurality of separately operative means for connecting the same together, and means for automatically shifting said connecting means into neutral positions and for automatically and selectively rendering one of said means operative upon the establishment of a predetermined speed ratio between the driving and driven elements.

7. In a power transmission mechanism, the combination with a driving element and a driven element, of means for connecting the same together, means for rendering the same operative, and means operated by the driving and driven elements for controlling the last-mentioned means.

8. In a power transmission mechanism, the combination with a driving element and a driven element, of means for connecting the same together, means for rendering the same operative, and means, operated by the driving and driven elements, for permitting the operation of the last-mentioned means when the speeds of the driving and driven elements reach a predetermined ratio.

9. In a power transmission mechanism, the combination with a driving element and a driven element, of means for connecting the same together, and means for automatically bringing said connecting means into operation when the speeds of the said elements are brought to a predetermined relation.

10. In a power transmission mechanism, the combination with a driving element and a driven element, of a plurality of means for connecting the same together, separate means for operating each of the connecting means and for selectively and automatically rendering the last-mentioned means operative when the speeds of the driving and driven elements bear a predetermined ratio.

11. In a power transmission mechanism, the combination with a driving element and a driven element, of means for connecting the same together, and electrically controlled means for automatically bringing said connecting means into operation when the speeds of the driving and driven elements reach a predetermined relation.

12. In a power transmission mechanism, the combination with a driving element and a driven element, of means for connecting the same together, means for operating the connecting means, electric means for controlling the last-mentioned means and including a plurality of normally open circuits, and means operated by the driving and driven elements to automatically and selectively close said circuits.

13. In a power transmision mechanism, the combination with a driving element and a driven element, of means for connecting the same together, spring-actuated means for bringing the connecting means into operation, and means for automatically bringing the spring-actuated means into operation when the speeds of the driving and driven elements reach a predetermined relation.

14. In a power transmission mechanism, the combination with a driving element and driven element, of means shiftable to connect said elements together, electrically controlled means for automatically shifting the first-mentioned means into operative positions when said elements reach a predetermined speed relation, and separate means for shifting the first mentioned means to inoperative positions.

15. In a power transmission mechanism, the combination with a driving element and a driven element, of a plurality of separately operative connections between said elements, means for bringing said connections in operative relation to said elements, and electric means for controlling the last-mentioned means which include a compound circuit closer the components of which are movable separately under the influence of the driving element and the driven element.

16. In a power transmission mechanism, the combination with a driving element and a driven element, of a plurality of means for connecting the same together, magnetically-controlled means for shifting the several connecting means successively into operative positions, means for controlling the controlling magnets including a compound circuit closer, the components of which are movable separately under the influence of the driving and driven elements in a ratio corresponding to the speed of the elements.

17. In a power transmission mechanism, the combination with a rotatable driving shaft and a rotatable driven shaft, of means for connecting them in different ratios at different times which means are automatically brought into operation for a selected speed ratio when the ratio is independently established between said shafts.

18. In a power transmission mechanism, the combination with a driving element and a driven element, of means for connecting said elements together, means for bringing the connecting means into operation, and controlling means for the last-mentioned means which controlling means is operated by the driving and driven elements and include a governing device connected to each of said elements.

19. In a power transmission mechanism, the combination with a driving shaft and a driven shaft, of means for connecting said shafts together, means for bringing the connecting means into operation, and controlling means for the last mentioned means which controlling means include two centrifugal governors, one connected to each shaft.

20. In a power transmission mechanism, the combination with two rotatable shafts, of a plurality of separately operative connections between said shafts which are effective for connecting them in different speed ratios and one of which connections includes a pair of coöperative gears, and means for automatically bringing said connections into operation when predetermined speed relations are established between said shafts.

21. In a power transmission mechanism, the combination with a driving element and a driven element, of means for connecting the same together for various relative speeds, means for shifting the aforementioned means, electrical means for controlling the last-mentioned means, a circuit closer for the electrical means having two movable terminal-carrying components, means for moving the components, independently, to a plurality of positions, means tending to prevent the movement of the last-mentioned means, and means controlled by the driving and driven elements for rendering the last-mentioned means effective to various degrees.

22. In a power transmission mechanism, the combination with a driving element and a driven element, of means for connecting the same together, a plunger for rendering the connecting means operative, electro-magnetic means for retracting the plunger, the said electro-magnetic means being included in a circuit open at two points, means for closing the circuit at one of the points upon the operation of the plunger, manually operable means for closing the circuit at the other point, electro-magnetic means included in a circuit open at two points for controlling the movement of the plunger, means for closing the circuit at one of the points and operable by the plunger upon its retractive movement, and automatically operated means for closing the circuit at the other point upon the two elements attaining a predetermined speed ratio.

23. In a power transmission mechanism, the combination with a driving element and a driven element, of means for connecting the same together, a plunger for shifting said connecting means, a solenoid for retracting the plunger, a solenoid for shifting the connecting means into a neutral position, manually controlled means for simultaneously energizing said solenoids, an electro-magnet for controlling the movement of the plunger, and means for automatically rendering said electro-magnet active.

Signed at New York, in the county of New York, and State of New York, this 7th day of March, A. D. 1917.

CHARLES R. UNDERHILL.

Witnesses:
  CHAS. F. DANE,
  C. J. BUTLER.